US010155180B2

(12) United States Patent
Koenig et al.

(10) Patent No.: US 10,155,180 B2
(45) Date of Patent: Dec. 18, 2018

(54) CONTACTING SYSTEMS AND METHODS AND USES THEREOF

(75) Inventors: Donald Koenig, San Diego, CA (US); Wesley Jung, Bonita, CA (US); Santosh Y. Limaye, El Cajon, CA (US); Stuart Robertson, El Cajon, CA (US); Stephen Walker, San Diego, CA (US)

(73) Assignee: Phyre Technologies, Inc., El Cajon, CA (US)

( * ) Notice: Subject to any disclaimer, the term of this patent is extended or adjusted under 35 U.S.C. 154(b) by 924 days.

(21) Appl. No.: 13/266,772

(22) PCT Filed: Apr. 28, 2010

(86) PCT No.: PCT/US2010/032814
§ 371 (c)(1),
(2), (4) Date: May 14, 2012

(87) PCT Pub. No.: WO2010/127028
PCT Pub. Date: Nov. 4, 2010

(65) Prior Publication Data
US 2012/0216677 A1 Aug. 30, 2012

Related U.S. Application Data

(60) Provisional application No. 61/174,428, filed on Apr. 30, 2009.

(51) Int. Cl.
*B01D 19/00* (2006.01)
*B01D 53/00* (2006.01)
(Continued)

(52) U.S. Cl.
CPC ..... *B01D 19/0005* (2013.01); *B01D 19/0057* (2013.01); *B01D 53/00* (2013.01);
(Continued)

(58) Field of Classification Search
CPC ............ B01D 19/0005; B01D 19/0057; B01D 53/00; B01F 3/04; C10G 21/00; C10G 29/20; C10G 2300/1051; C10G 2300/1055
See application file for complete search history.

(56) References Cited

U.S. PATENT DOCUMENTS 4,179,222 A * 12/1979 Strom ................ F28F 13/12
138/38
4,732,582 A   3/1988 Mojonnier
(Continued)

FOREIGN PATENT DOCUMENTS

| GB | 1156417 A | 6/1969 |
|---|---|---|
| WO | WO-2006/086046 | 8/2006 |
| WO | 2007/052236 A1 | 5/2007 |

OTHER PUBLICATIONS

International Search Report and the Written Opinion dated Jun. 23, 2010 for PCT Application No. PCT/US2010/032814.
(Continued)

*Primary Examiner* — David A Reifsnyder
(74) *Attorney, Agent, or Firm* — Kilpatrick Townsend & Stockton LLP (57) ABSTRACT

In accordance with the present invention, there are provided systems and methods for contacting two or more fluids, useful, for example for purifying or infusing a fluid (by allowing efficient and/or uniform addition of components to or removal of components from the fluid). The components may be undesirable components to be removed from a fluid, or a desired component or components to be added to the fluid, for example, each of which is referred to herein as "component". In this regard, the disclosed embodiments provide for the purification or infusion of a fluid by passing a liquid and a fluid through a contacting zone which facilitates intimate mixing of the liquid and the fluid. A differential of partial pressure, activity, fugacity or concentration
(Continued)

of the components between the liquid and the fluid facilitates the transfer of the components between the liquid and the fluid in the intimately mixed liquid and fluid.

21 Claims, 10 Drawing Sheets

(51) Int. Cl.
    *B01F 3/04*     (2006.01)
    *C10G 21/00*     (2006.01)
    *C10G 29/20*     (2006.01)

(52) U.S. Cl.
    CPC ................ *B01F 3/04* (2013.01); *C10G 21/00* (2013.01); *C10G 29/20* (2013.01); *C10G 2300/1051* (2013.01); *C10G 2300/1055* (2013.01)

(56) References Cited

U.S. PATENT DOCUMENTS

| | | |
|---|---|---|
| 5,080,695 A | 1/1992 | Kassarjian |
| 6,080,320 A | 6/2000 | Von Phul |
| 6,241,955 B1 | 6/2001 | Alvarez |
| 7,459,081 B2 | 12/2008 | Koenig et al. |
| 2003/0121416 A1 | 7/2003 | Morse et al. |

OTHER PUBLICATIONS

Extended European Search Report dated May 15, 2014, for European Application No. 10770278.9, 13 pages.
CA2,760,459, "Office Action", dated Feb. 9, 2017, 3 pages.
EP10770278.9, "Office Action", dated Feb. 15, 2017, 6 pages.

\* cited by examiner

CONTACTING SYSTEMS AND METHODS AND USES THEREOF

FIELD OF THE INVENTION

The present invention relates generally to the field of contacting systems and methods. In particular, the invention relates to systems and methods of contacting two or more fluids and uses thereof, such as removing contaminants from or adding supplements to liquids, such as fuels.

BACKGROUND OF THE INVENTION

Removal of a material from or addition of a material to a fluid (e.g., a liquid) can be useful in many applications. For example, adding a gas to a liquid is required for the production of carbonated beverages. Removal of a gas from a liquid may be desirable to produce a purified liquid, for example. Purified fluids are desirable in many applications. In particular, removal of contaminants from a liquid may be required in many industrial and commercial applications. For example, in the case of fuels, such as diesel or jet fuels, impurities in the fuel can result in high maintenance costs and poor performance. For example, the presence of oxygen in fuels can result in poor performance of a machine using the fuel, such as a jet engine. Further, oxygen-saturated fuels can inhibit a coolant or heat-sink function served by fuels when the oxygen-saturated fuel causes coking, thereby restricting fuel flow.

Conventional methods of removing contaminants, such as oxygen, from liquids, such as fuels, have considerable drawbacks. For example, use of reducing agents to chemically bind the oxygen results in further contamination issues related to the active metals which may be used. Further, the large volume and weight of such systems prohibits their use in many circumstances, e.g., on aircraft in-flight purification systems. Accordingly, there remains a need for improved systems and methods of treating fluids while eliminating such drawbacks.

SUMMARY OF THE INVENTION

In accordance with the present invention, there are provided systems and methods for contacting two or more fluids. Invention systems and methods are useful, for example for purifying or infusing a fluid (by allowing efficient and/or uniform addition of components to, or removal of components from, the fluid). The components may be undesirable components to be removed from a fluid, or a desired component or components to be added to the fluid, for example, each of which is referred to herein as "component". In this regard, the disclosed embodiments provide for the purification or infusion of a fluid by passing a liquid and a fluid through a contacting zone which facilitates vigorous and intimate mixing of the liquid and the fluid. Within the contacting zone, the liquid and the fluid mixture has a component partial pressure differential. The vigorous and intimate mixing of the liquid and the fluid within the contacting zone facilitates transfer of at least some of the component between the liquid and the fluid as a result of a differential of partial pressure, activity, fugacity or concentration of the components between the liquid and the fluid.

One embodiment of the invention relates to methods of contacting a liquid and a fluid, said method comprising passing a liquid and a solid through a defined contacting zone, thereby causing vigorous and intimate mixing of the liquid and the fluid, and facilitating contact therebetween.

In one embodiment of the invention, said contacting facilitates transferring a component between a liquid and a fluid. Invention methods include passing a liquid (such as a fuel), and a fluid (such as a gas), through a contacting zone, wherein at least one of the liquid and the fluid contain a component, such as oxygen gas, therein. Thus, the invention contemplates transfer of a component from the liquid phase to the fluid phase, or, alternatively, from the fluid phase to the liquid phase.

In another embodiment of the invention, contacting facilitates purification of a liquid by removal of component(s) therefrom. Thus, in one aspect, the invention contemplates transfer of a component from the liquid phase to the fluid phase. Invention methods may also include, for example, separating the liquid and the fluid after the transfer of the component.

In yet another embodiment of the invention, contacting facilitates purification of a fluid by removal of component(s) therefrom. Thus, in another aspect, the invention contemplates transfer of a component from the fluid phase to the liquid phase. Invention methods may also include, for example, separating the liquid and the fluid after the transfer of the component.

In another embodiment of the invention, there are provided methods of purifying a liquid (and/or a fluid). Invention methods include passing a liquid (such as a fuel), and a fluid (such as a gas), through a contacting zone, wherein at least one of the liquid and the fluid contain a component, such as oxygen gas, therein. Within the contacting zone, the liquid and the fluid mixture has a component partial pressure differential. The vigorous mixing of the liquid and the fluid within the contacting zone facilitates transfer of at least some of the component between the liquid and the fluid. Invention methods may also include, for example, separating the liquid and the fluid after the transfer of the component.

In yet another embodiment, the invention includes a system for transferring a component between a liquid and a fluid. The system includes a contacting zone adapted to cause vigorous and intimate mixing of a liquid and a fluid and transfer of at least some of a component between the liquid and the fluid, a fluid purification module adapted to remove the component from the liquid and/or fluid, a recirculation line adapted to transfer at least a portion of the fluid from the fluid purification module back to the contacting zone, and optionally a separator for separating the liquid and the fluid.

In still another embodiment, the invention includes a system for transferring a component between a liquid and a fluid. The system includes a contacting zone adapted to cause vigorous and intimate mixing of a liquid and a fluid and transfer of at least some of a component between the liquid and the fluid, a separator for separating the liquid and the fluid, and a recirculation line adapted to transfer at least a portion of the fluid from the fluid purification module back to the contacting zone.

In a further embodiment, the invention includes a system for removing a component from a liquid and/or a fluid. The system includes a contacting zone adapted to cause vigorous and intimate mixing of a liquid and a fluid and removal of at least some of a component from the liquid and/or the fluid, and a separator for separating the liquid and the fluid.

In yet another embodiment, the invention includes a system for removing a component from a liquid and/or a fluid. The system includes a contacting zone adapted to cause vigorous and intimate mixing of a liquid and a fluid and transfer of at least some of a component between the liquid and the fluid, a fluid purification module adapted to remove the component from the liquid and/or fluid, a recirculation line adapted to transfer at least a portion of the fluid from the fluid purification module back to the contacting zone, and optionally a separator for separating the liquid and the fluid.

In still another embodiment, the invention includes a system for removing a component from a liquid and/or a fluid. The system includes a contacting zone adapted to cause vigorous and intimate mixing of a liquid and a fluid and transfer of at least some of a component between the liquid and the fluid, a separator for separating the liquid and the fluid, and a recirculation line adapted to transfer at least a portion of the fluid from the fluid purification module back to the contacting zone.

DETAILED DESCRIPTION OF THE PREFERRED EMBODIMENTS

In accordance with one embodiment of the present invention, there are provided systems for removing a component from a first phase and/or a second phase,
wherein said component is present in at least one of the first phase and the second phase, and
wherein one of said first phase or said second phase is a liquid phase, and the other of said first phase or said second phase is a fluid phase.
The invention system comprises:
a contacting zone adapted to facilitate contact between said first phase and said second phase, and to cause mixing of said first phase and said second phase,
a fluid purification module adapted to remove said component from said fluid when said transfer includes transferring component from said liquid to said fluid, wherein the fluid purification module is adapted to catalytically consume at least a portion of said component in said fluid, and
a recirculation line adapted to transfer at least a portion of said fluid from said fluid purification module to said contacting zone.

As used herein, a "component" may be an impurity in a liquid phase or a gas phase which is desired to be removed therefrom; alternatively, a "component" may be an additive which is desirable to incorporate into a liquid phase or a gas phase. Components contemplated by the present invention may be mixed, absorbed, suspended or dissolved in the liquid or the fluid before being subjected to invention methods, or as a result of being subjected to invention methods.

In a particular embodiment, the component is a gas that is dissolved in the liquid prior to passing the liquid and the fluid through the porous medium.

"Fluid" may be a liquid, a gas or a material in any phase which allows the material to flow readily.

In one embodiment, the fluid is a gas. In a particular embodiment, the gas is a non-reactive gas under operating conditions, such as nitrogen, argon, helium or carbon dioxide, that is substantially free of the component. In other embodiments, the gas may be a noble gas.

In another embodiment, the fluid is a liquid. In a particular embodiment, the liquid is a combustible material and the component is a gas. The combustible material may be a hydrocarbon (such as an oil or a fuel), an organic chemical such as an aromatic hydrocarbon (e.g., benzene, toluene, xylene, or the like), an alcohol (e.g., methanol, ethanol, or the like), an aldehyde or ketone (e.g., acetone, methyl ethyl ketone, or the like), and the like. Exemplary fuels include diesel, kerosene or jet fuel, for example. The gas may be oxygen.

In another embodiment, the liquid is non-combustible. Exemplary non-combustible liquids include water, sea water, carbonated or non-carbonated beverages, juices, beer, wine, honey, vegetable oil (e.g., olive oil, sunflower oil, canola oil, and the like), and the like.

Figure 10:
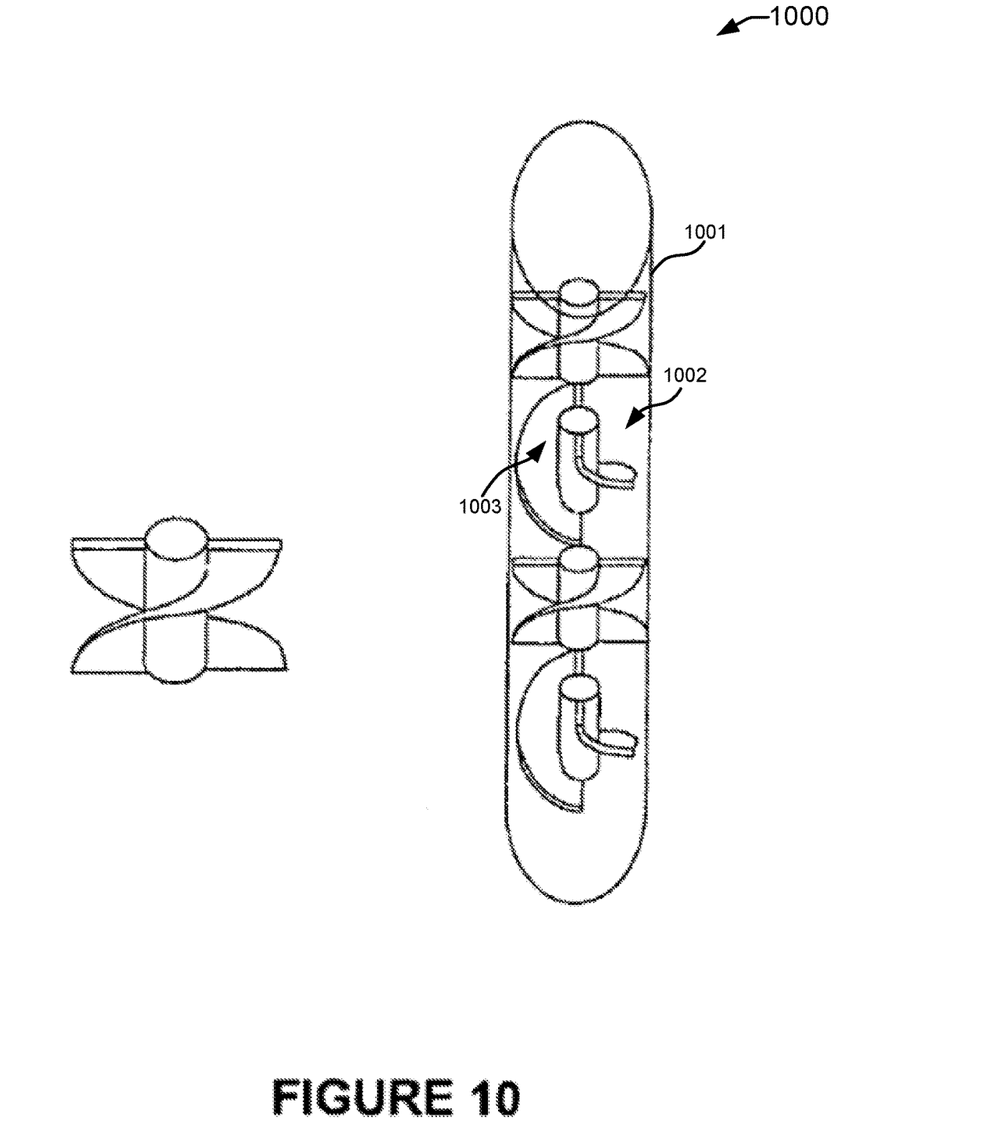
FIG. 10 is an illustration of an exemplary contacting zone contemplated for use in the practice of the present.

As used herein, the term "contacting zone" refers to an element which facilitates mixing (e.g., intimate, vigorous, turbulent mixing) of the fluids introduced therein. An exemplary contacting zone contemplated for use in the practice of the present invention comprises a passageway divided into at least two channels that extend in non-linear fashion along the length of the passageway and change flow directions abruptly in periodic fashion, thereby causing continuous mixing and re-distribution between the first phase and the second phase throughout the passageway, thus creating intimate contact between the first phase and the second phase, allowing the efficient transfer of a component therebetween. An exemplary contacting zone contemplated for use in the practice of the present invention is illustrated in FIG. 10.

As used herein, "fluid purification modules" contemplated for use in the practice of the present invention are adapted to remove the component from the fluid. In a particular embodiment, the fluid purification module may comprise a pressure swing adsorption module. In other embodiments, the purification module may comprise one or more membranes. In still other embodiments, the purification module may be adapted to catalytically consume at least a portion of the component in the fluid. A recirculation line may be provided to transfer the fluid from the fluid purification module to the contacting zone.

As used herein, "purification" and "purifying" refer to the removal from a fluid of one or more components. The removal may be partial, complete or to a desired level and may include removal of only some or all components.

In accordance with this aspect of the present invention, the system also includes a recirculation line adapted to transfer the fluid from the separator to the contacting zone, The invention system may also include a variety of additional components, such as, for example, a pre-mixer adapted to provide a mixture of the fluid and liquid to the contacting zone, a separator for separating liquid and fluid (optionally including a vapor trap) adapted to separate vaporized liquid mixed with the fluid from the separator, a gas scavenger downstream of the fluid purification module, an independent source of fuel to facilitate deactivation of the reactive components within the reaction zone, an independent source of makeup air in fluid communication with the container, and the like.

When present, pre-mixers contemplated for use in the practice of the present invention are adapted to provide a mixture of the fluid and the liquid to the contacting zone. In a particular embodiment, the pre-mixer includes a plurality of substantially axial channels for passing the liquid therethrough into a path substantially aligned with the axial channels (preferably an axial path) directed toward the contacting zone, and optionally a porous body for diffusing the fluid into the path. The pre-mixer may also include an annular passage along a circumferential perimeter of the pre-mixer for receiving the fluid and directing the fluid to the porous body.

In this regard, "a path substantially aligned with the axial channels" refers to the general direction of flow. The path may include a conical or radial component. For example, in certain regions, the path may include only a radial component which transitions or diffuses into an axial flow.

The optional porous body includes a porous medium with pores therein. The pores are adapted to cause surface mixing of a fluid with a liquid having a component flowing through the porous body. The pores have pore sizes sufficiently small and pore shapes sufficiently complex to cause surface mixing. The porous medium may be made of an inert material, such as metals, ceramics, plastic, glass or other organic or inorganic solid materials. In a particular embodiment, the porous medium includes pores having a pore size of less than 500 microns. In a further particular embodiment, the pore size is between about 350 and about 450 microns. In a still further embodiment, the pore size is approximately 400 microns.

Separators contemplated for use in the practice of the present invention include at least one centrifugal separator, and the like.

When present, "vapor traps" contemplated for use in the practice of the present invention are adapted to capture vaporized liquid from the fluid from the separator, and include chemical and physical means of capturing vapors.

When present, "gas scavengers" contemplated for use in the practice of the present invention are generally positioned downstream of the fluid purification module, and are capable of scavenging such gases as $H_2O$, $CO_2$, $O_2$, and the like. Exemplary gas scavengers include desiccants, and the like.

When present, "independent sources of fuel" are employed to facilitate deactivation of the reactive components within the reaction zone. Exemplary independent sources of fuel include a free-standing reservoir of one or more reactive hydrocarbon (e.g., propane, butane, and the like) or mixtures thereof (e.g., gasoline, jet fuel, fuel oil, and the like).

When present, "independent sources of makeup air" are employed in the practice of the present invention to equilibrate pressure in the contacting zone, to provide reactant to facilitate removal of contaminating components from the fluid being treated, to replace the gaseous atmosphere in the contacting zone, and the like. Exemplary independent sources of makeup air include ambient air, substantially purified air, substantially purified inert gas (e.g., $N_2$, Ar, and the like), oxygen-containing carrier gas, and the like.

In accordance with another embodiment of the present invention, there are provided systems for removing a component from a first phase and/or a second phase,
    wherein at least one of the first phase and the second phase has said component therein, and
    wherein one of said first phase or said second phase is a liquid phase, and the other of said first phase or said second phase is a fluid phase,
    said system comprising:
    a contacting zone adapted to facilitate contact between said first phase and said second phase, and to cause mixing of said first phase and said second phase,
    a separator for separating said liquid and said fluid after said mixing, and
    a recirculation line adapted to transfer at least a portion of said fluid from said fluid purification module to said contacting zone.

The invention system may also include a variety of additional components, such as, for example, a fluid purification module adapted to remove the component from the fluid when the transfer includes transferring component from the liquid to the fluid, an independent source of fuel to facilitate the deactivation of the reactive components within the reaction zone, an independent source of makeup air in fluid communication with the container, a gas scavenger downstream of the fluid purification module, a vapor trap adapted to separate vaporized liquid mixed with fluid from the separator, and the like.

In accordance with a further embodiment of the present invention, there are provided systems for transferring a component between a first phase and/or a second phase,
    wherein said component is present in at least one of the first phase and the second phase, and
    wherein one of said first phase or said second phase is a liquid phase, and the other of said first phase or said second phase is a fluid phase.

The invention system comprises:
    a contacting zone adapted to facilitate contact between said first phase and said second phase, and to cause mixing of said first phase and said second phase,
    a fluid purification module adapted to remove said component from said fluid when said transfer includes transferring component from said liquid to said fluid, wherein the fluid purification module is adapted to catalytically consume at least a portion of said component in said fluid, and
    a recirculation line adapted to transfer at least a portion of said fluid from said fluid purification module to said contacting zone.

In accordance with yet another embodiment of the present invention, there are provided systems for transferring a component between a first phase and a second phase,
    wherein at least one of the first phase and the second phase has said component therein, and
    wherein one of said first phase or said second phase is a liquid phase, and the other of said first phase or said second phase is a fluid phase,
    said system comprising:
    a contacting zone adapted to facilitate contact between said first phase and said second phase, and to cause mixing of said first phase and said second phase,
    a separator for separating said liquid and said fluid after said mixing, and
    a recirculation line adapted to transfer at least a portion of said fluid from said fluid purification module to said contacting zone.

In accordance with still another embodiment of the present invention, there are provided methods of facilitating contact between a liquid and a fluid, said method comprising passing a liquid and a fluid through a contacting zone, said passing causing mixing of said liquid and said fluid and facilitating contact between said liquid and said fluid, wherein said contacting zone 1000 comprises a passageway 1001 to transport the mixture of the first phase and the second phase, wherein the passageway 1001 is divided into at least two channels 1002, 1003 that extend in non-linear fashion along the length of the passageway 1001 and change flow directions abruptly in periodic fashion, thereby causing continuous mixing and re-distribution between the first phase and the second phase throughout the passageway 1001, thus creating intimate contact between the first phase and the second phase.

In accordance with a further embodiment of the present invention, there are provided methods for transferring a component between a liquid and a fluid, or between a fluid and a liquid. The method includes passing a liquid and a fluid through a contacting zone as described herein. The method may further include separating the liquid and the fluid, at least one of the separated fluid and the separated liquid including at least some of the component.

In a particular embodiment, the method also includes removing the component from the fluid if the component has been transferred from the liquid to the fluid. Removing the component may include pressure swing adsorption. In a further particular embodiment, the purified fluid may be recirculated for use in any continuation of passing the fluid through the contacting zone.

In a particular embodiment, the method also includes recovering any vaporized liquid mixed with the fluid after separation of the fluid from the liquid.

In one embodiment, the method also includes passing the liquid and the fluid through a pre-mixer before passing through the contacting zone. In a particular embodiment, the pre-mixer includes a plurality of axial channels for passing the liquid therethrough into an axial path directed toward the porous medium and a porous body for diffusing the fluid into the axial path. The pre-mixer may further include an annular passage along a circumferential perimeter of the pre-mixer for receiving the fluid and directing the fluid to the porous body.

In one embodiment, separating the liquid and the fluid includes passing the fluid and the liquid through at least one centrifugal separator.

Still another embodiment of the invention includes methods of purifying a liquid. The method includes passing a liquid and a fluid through a contacting zone as described herein, the liquid containing a component therein, the passing causing vigorous and intimate mixing of the liquid and the fluid and transfer of at least some of the component from the liquid to the fluid. The method also includes separating the liquid and the fluid, the separated fluid including at least some of the component, and removing the component from the fluid. The fluid with the component removed is re-circulated for use in any continuation of passing the liquid and fluid through the porous medium.

Another embodiment of the invention includes a mixing body adapted to pre-mix the liquid and the fluid prior to introducing liquid and fluid into the contacting zone described herein. The mixing body includes a plurality of axial channels for passing a liquid therethrough into a path substantially aligned with the axial channels and a porous body for diffusing a fluid into the path. In a particular embodiment, the mixing body also includes an annular passage along a circumferential perimeter of the porous body for receiving the fluid and directing the fluid to the porous body.

Figure 1:
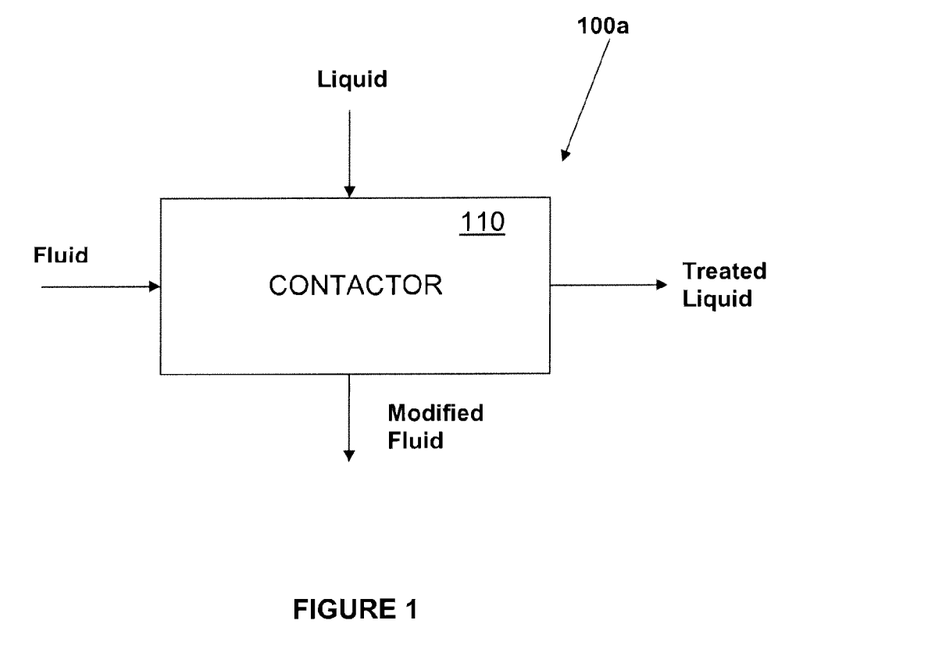
FIG. 1 is a schematic illustration of one embodiment of a contacting system according to the invention.

Referring now to the figures, FIG. 1 illustrates an exemplary system for use according to the invention, e.g., for transferring a component, such as a contaminant, between a liquid and a fluid. In the illustrated example, the component is contained in a liquid to be purified. Of course, in other embodiments, the component may be contained in the fluid or the fluid itself. In the example of FIG. 1, the liquid to be treated may be a fuel having a component, such as gaseous oxygen, absorbed therein. In other embodiments, other liquids with a variety of components may be purified.

The system 100a includes a contacting zone 110, which is described in greater detail below. Contacting zone 110 is adapted to receive a liquid (e.g., a fuel) and a fluid (e.g., gaseous nitrogen). The liquid may have a component, such as gaseous oxygen, absorbed therein. The gaseous nitrogen is preferably substantially oxygen-free. Passage of the liquid and fluid (e.g., gaseous nitrogen) through contacting zone 110 causes the gaseous oxygen to be transferred from the liquid to the fluid. Thus, the outputs of the contacting zone 110 in the system 100a are treated liquid (e.g., de-oxygenated fuel) and modified fluid (e.g., gaseous nitrogen with oxygen absorbed therein). A limited amount of vaporized liquid (e.g., fuel vapor) may be output with the modified fluid (e.g., nitrogen/oxygen stream).

Figure 2:
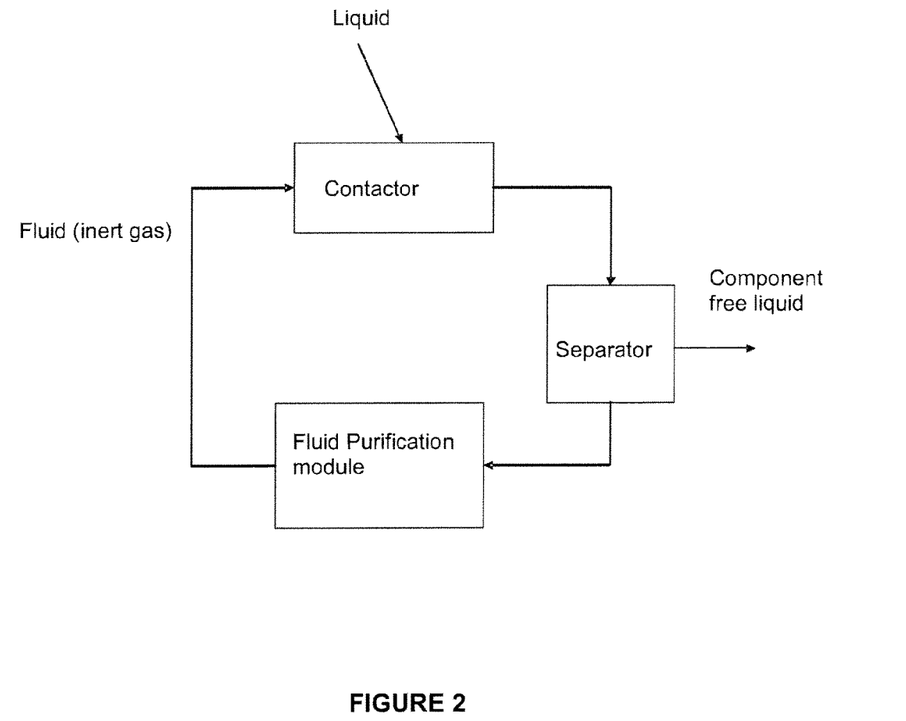
FIG. 2 is a schematic illustration of another embodiment of a contacting system according to the invention.

Referring now to FIG. 2, another embodiment of a purification system according to the present invention is illustrated, wherein liquid and fluid are treated in a substantially closed-loop system. Thus, liquid and fluid are both introduced into contactor 110, then the vigorously combined materials are passed through separator 300, which produces treated liquid and modified fluid. The modified fluid can then be passed through a fluid purification module to remove any remaining impurities therefrom. Once subjected to the action of the fluid purification module, the resulting treated fluid can then be re-circulated to contactor 110.

Figure 3:
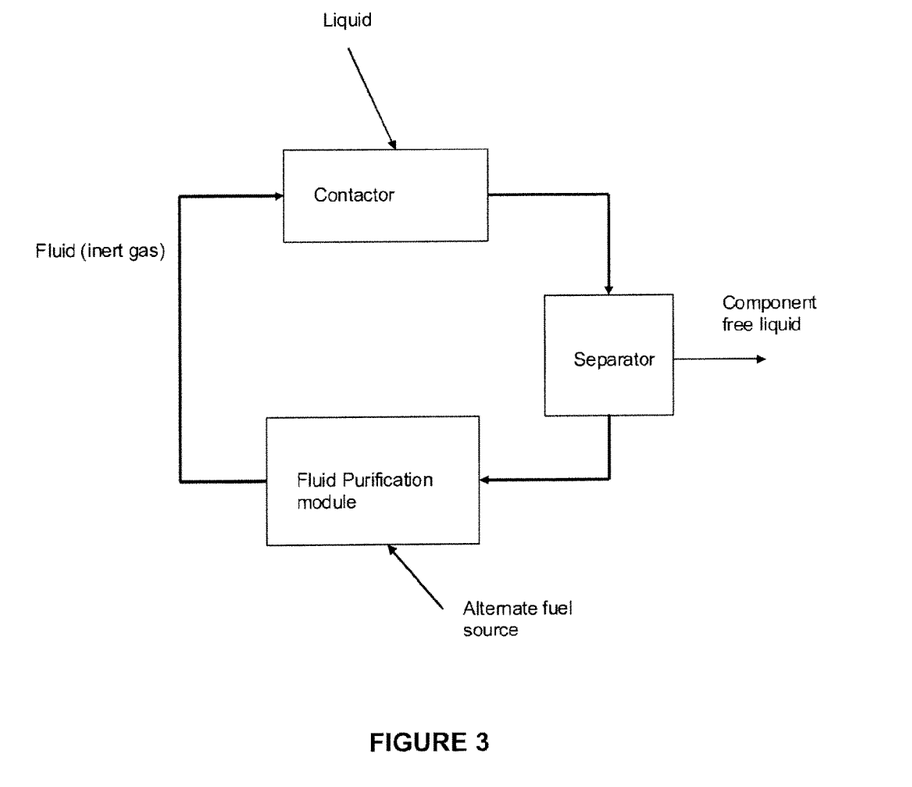
FIG. 3 is a schematic illustration of yet another embodiment of a contacting system according to the invention.

Referring now to FIG. 3, yet another embodiment of a purification system according to the present invention is illustrated, wherein liquid and fluid are treated in a substantially closed-loop system in a manner substantially as described above with reference to FIG. 2, wherein an alternate source of fuel is employed to facilitate removal of impurities from the liquid and/or fluid components being treated. Thus, liquid and fluid are both introduced into contactor 110, then the vigorously combined materials are passed through separator 300, which produces treated liquid and modified fluid. The modified fluid can then be passed through a fluid purification module (optionally supplemented by an alternate/auxiliary source of fuel) to remove any remaining impurities therefrom. Once subjected to the action of the fluid purification module, the resulting treated fluid can then be re-circulated to contactor 110.

Figure 4:
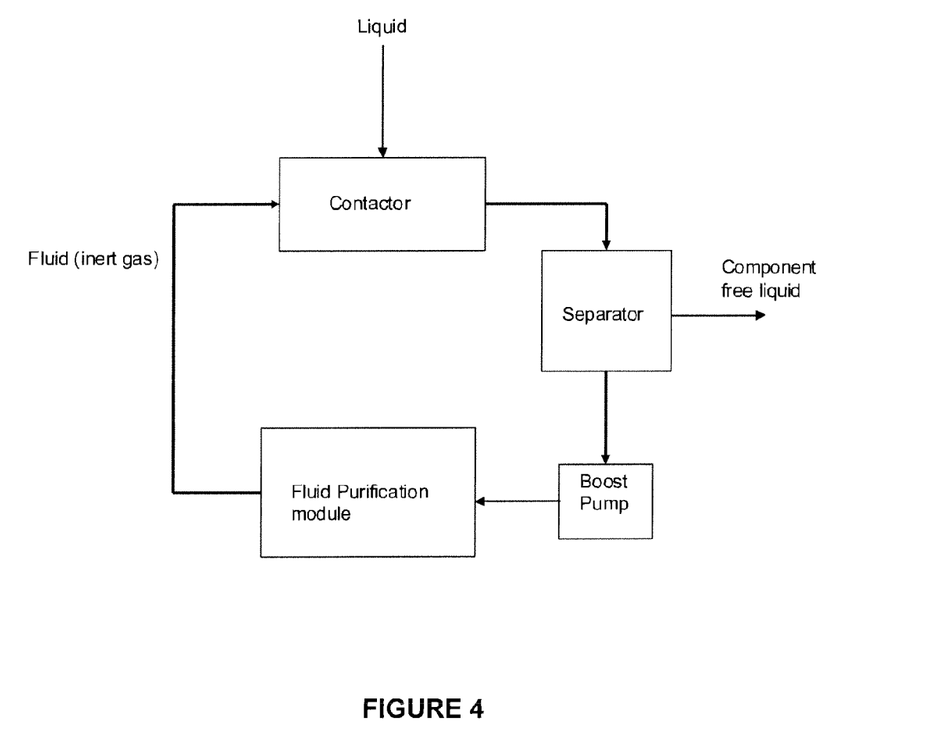
FIG. 4 is a schematic illustration of still another embodiment of a contacting system according to the invention.

Referring now to FIG. 4, still another embodiment of a purification system according to the present invention is illustrated, wherein liquid and fluid are treated in a substantially closed-loop system in a manner substantially as described above with reference to FIG. 2, wherein one or more boost pumps are employed to facilitate movement of liquid and/or fluid within the substantially closed loop system. Thus, liquid and fluid are both introduced into contactor 110, then the vigorously combined materials are passed through separator 300, which produces treated liquid and modified fluid. The modified fluid can then be passed through a fluid purification module to remove any remaining impurities therefrom. Once subjected to the action of the fluid purification module, the resulting treated fluid can then be re-circulated to contactor 110.

Figure 5:
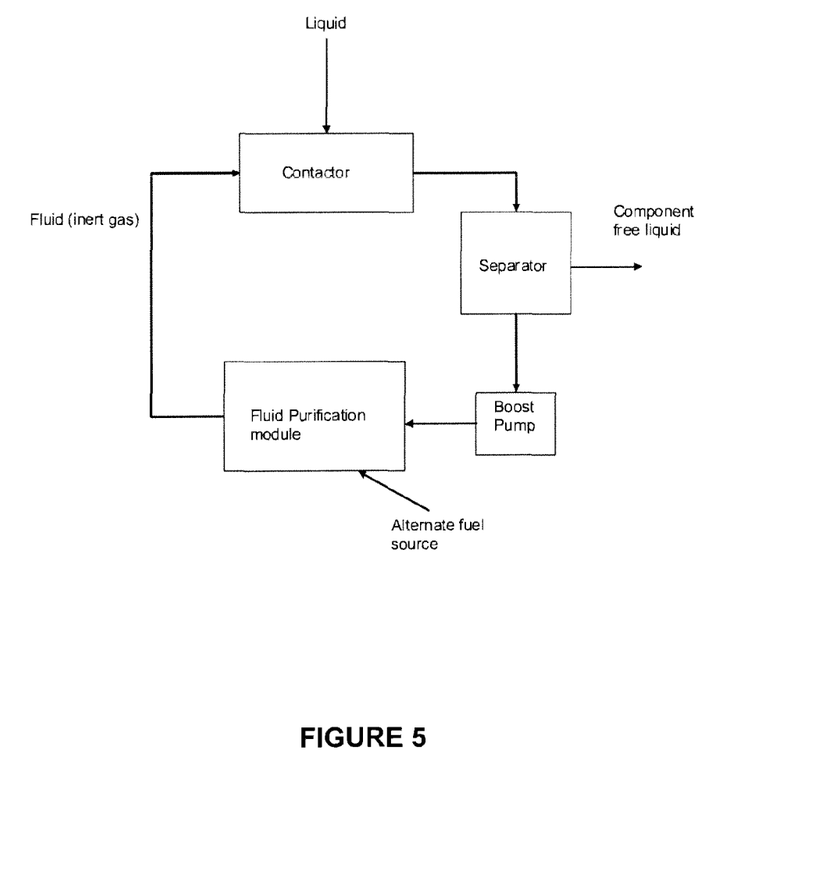
FIG. 5 is a schematic illustration of a further embodiment of a contacting system according to the invention.

Referring now to FIG. 5, a further embodiment of a purification system according to the present invention is illustrated, wherein liquid and fluid are treated in a substantially closed-loop system in a manner substantially as described above with reference to FIG. 4, wherein an alternate source of fuel is employed to facilitate removal of impurities from the liquid and/or fluid components being treated. Thus, liquid and fluid are both introduced into contactor 110, then the vigorously combined materials are passed through separator 300, which produces treated liquid and modified fluid. The modified fluid can then be passed through a fluid purification module (optionally supplemented by an alternate/auxiliary source of fuel) to remove any remaining impurities therefrom. Once subjected to the action of the fluid purification module, the resulting treated fluid can then be re-circulated to contactor 110.

Figure 6:
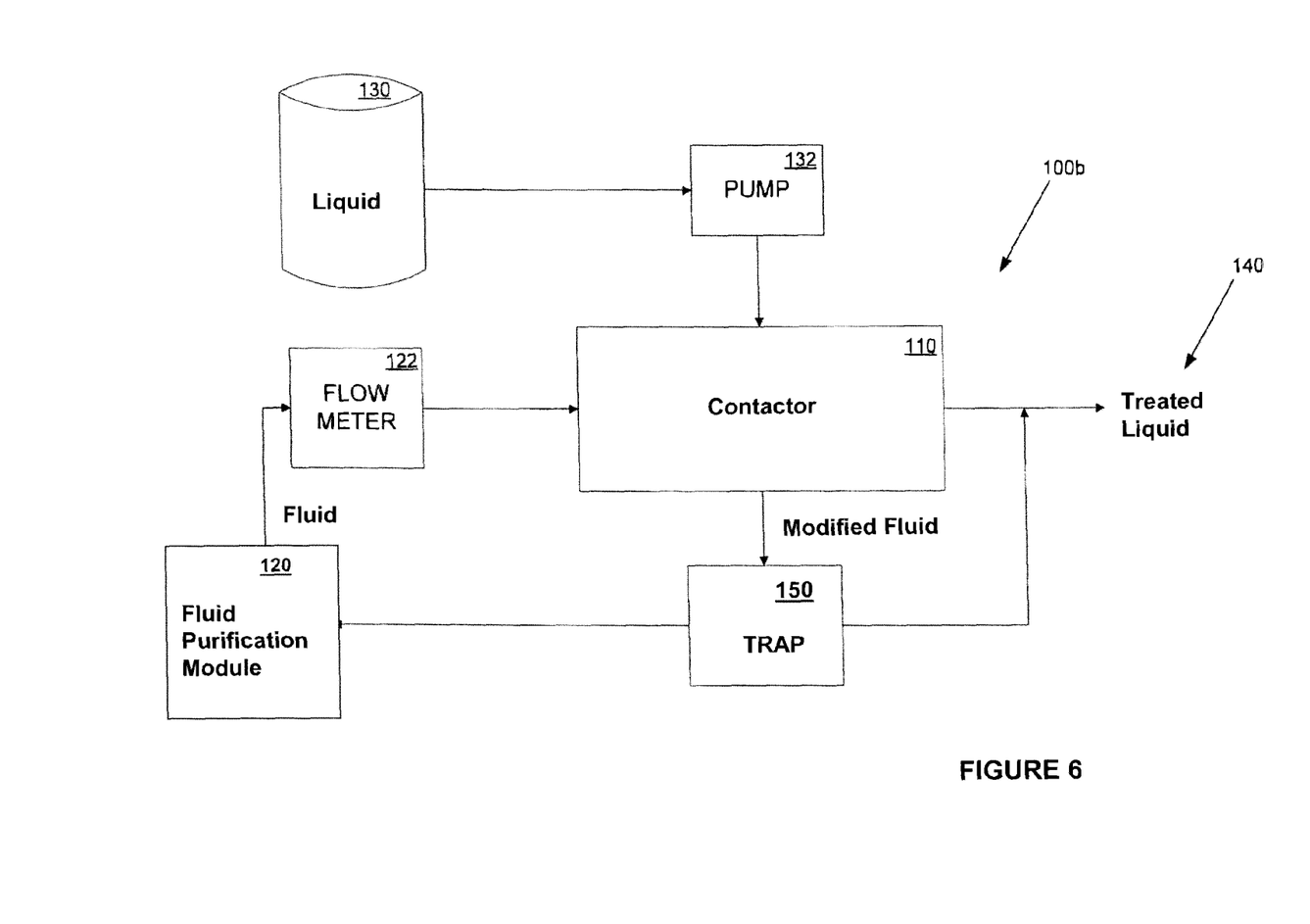
FIG. 6 is a schematic illustration of another embodiment of a contacting system according to the invention.

Referring now to FIG. 6, another embodiment of a purification system is illustrated. In the system 100b, the contacting zone 110 is adapted to receive a liquid (e.g., fuel) from a reservoir such as tank 130. The flow of liquid into the contacting zone 110 may be facilitated by a pump 132 positioned between tank 130 and contacting zone 110. Tank 130, pump 132 and contacting zone 110 are connected using tubes, pipes or lines, for example. The size of tank 130 and the capacity of pump 132 may be determined according to particular applications and requirements. In one embodiment, the contacting zone 110 is adapted to receive and process liquid at the rate of 2 U.S. gallons per minute.

The contacting zone 110 is also adapted to receive a supply of a fluid, such as a gas, to mix with the liquid. In certain embodiments, the fluid is a non-reactive gas, such as nitrogen, argon, or the like. In the illustrated example, the fluid is nitrogen gas. The nitrogen may be received from a pressurized nitrogen bottle. In other embodiments, the nitrogen is received from a fluid purification module, such as a fluid purification module 120, which supplies substantially oxygen-free fluid. The flow of substantially oxygen-free fluid into the contacting zone 110 may be regulated using a flow meter 122, for example. In one embodiment, the contacting zone 110 is adapted to receive fluid and liquid at a rate based on the desired liquid output. For example, a large fluid-to-liquid ratio may be used to obtain a more purified liquid while a smaller fluid-to-liquid ratio may be used to obtain a less purified liquid. In particular embodiments, the fluid-to-liquid ratio may be 10:1, 4:1, 2:1, 1:1, 1:2, 1:4, or 1:10.

The contacting zone 110 is adapted to transfer the component, such as oxygen gas, from the liquid to the fluid (e.g., nitrogen gas). This aspect of the contacting zone is described in greater detail below with reference to FIGS. 8 and 9. Thus, the output of the contacting zone 110 includes a stream of de-oxygenated liquid 140 and a separate stream of nitrogen gas with oxygen.

In many cases, certain amounts of the liquid may evaporate either in the contacting zone 110 or prior to entering the contacting zone 110. In this regard, the system 100b includes a vapor recovery module 150 through which the nitrogen stream is processed. The vapor recovery module 150 may be a vapor trap including a coalescing filter adapted to separate the liquid vapor from the nitrogen stream, producing condensed liquid. The condensed liquid is then routed to the liquid stream 140 exiting the contacting zone 110, as shown in FIG. 6. In other embodiments, in order to maintain the deoxygenated level of the liquid 140 from the contacting zone 110, the recovered liquid vapor may be routed to tank 130.

The stream of nitrogen with oxygen from the vapor recovery module 150 can then be directed to fluid purification module 120, which separates the oxygen from the nitrogen. The purified nitrogen can then be used for removal of contaminant (e.g., deoxygenation) of additional liquid, while the oxygen can be vented to the atmosphere. In cases where the system 100b is operating in a closed environment, such as a laboratory or an operational application in a closed area, the stream of nitrogen and oxygen may be further treated prior to being directed to fluid purification module 120. The stream of nitrogen and oxygen may be similarly treated in systems without a fluid purification module. For example, the stream of nitrogen and oxygen may be treated through an active carbon filter to remove components prior to either fluid purification module processing or venting to the atmosphere. In other embodiments, the active carbon filter may be positioned upstream of fluid purification module 120. Thus, the components may be removed from the nitrogen as well.

Figure 7:
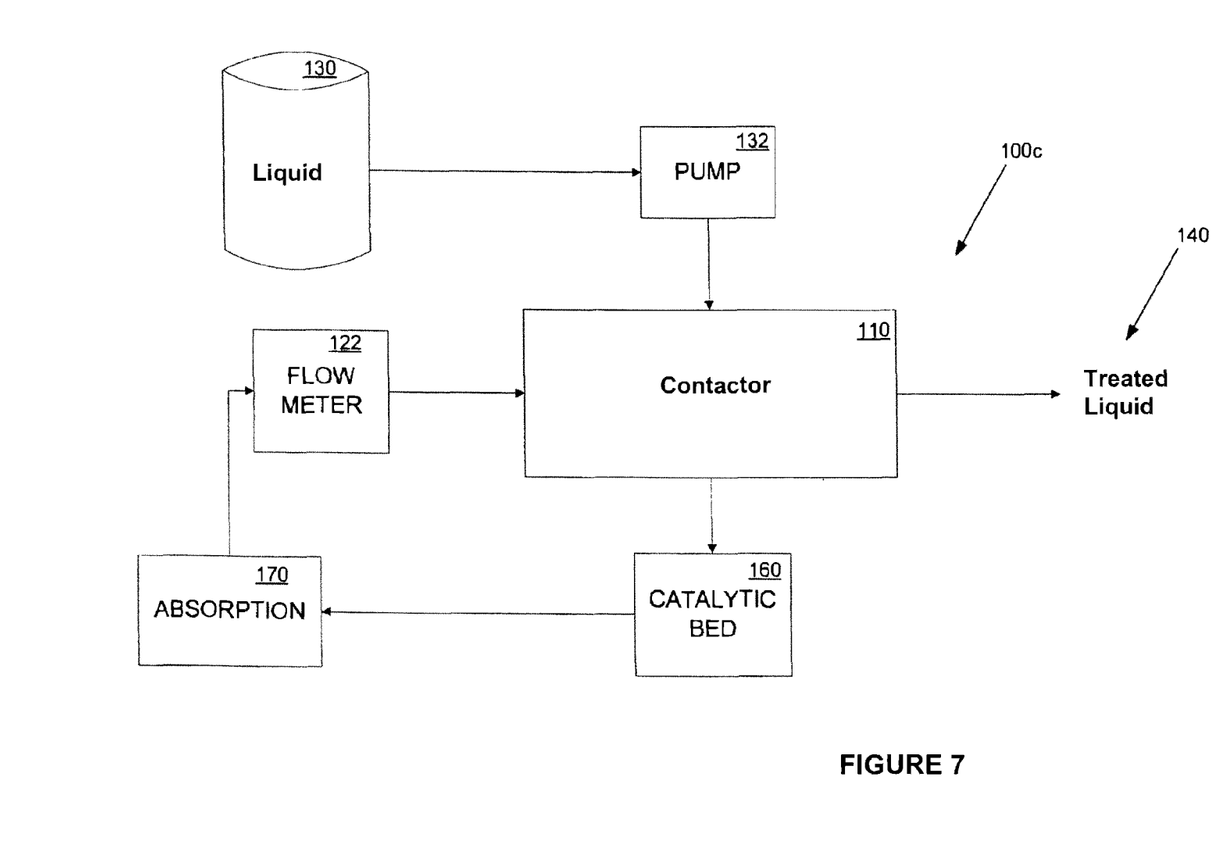
FIG. 7 is a schematic illustration of still another embodiment of a contacting system according to the invention.

FIG. 7 illustrates still another embodiment of a purification system. In the system 100c, the stream of nitrogen, oxygen and liquid vapor produced by contacting zone 110 is directed through a catalytic bed 160. The catalytic bed 160 is adapted to cause a reaction between the vapor and the oxygen molecules to produce carbon dioxide and water. Thus, the output of the catalytic bed 160 is a mixture of nitrogen, water, carbon dioxide and any remaining fuel vapor. This mixture is then directed to an adsorption module 170. The adsorption module 170 is adapted to absorb water, either liquid or vapor, from the stream. The water from the stream may be either retained within the adsorption module 170 or otherwise directed out of the stream. Thus, oxygen is effectively removed from the stream, while carbon dioxide is added. The carbon dioxide can continue to function as an oxygen-free fluid, in addition to the nitrogen, in the transfer of oxygen from the fuel.

The exemplary purification system 100 is illustrated in further detail in FIG. 7. The system 100, in certain embodiments, includes pre-treatment of the liquid and control modules for controlling various aspects of the system 100. The pre-treatment of the liquid may include processing the liquid through a filter system 134 to remove certain components, such as solid particles, to prevent such components from affecting the operation of the contacting zone 110. Such filter systems are well known to those skilled in the art.

Further, a thermal regulator 136 may be provided to control the temperature of the liquid. The temperature may require regulation based on the requirements of the machine for which the liquid is deoxygenated. The thermal regulator 136 may include a heater for increasing the liquid temperature and/or a heat exchanger for increasing or decreasing the liquid temperature. In certain embodiments, the temperature of the liquid may be increased to facilitate removal of a component.

The control system 400 includes control modules for controlling the various modules of the system 100. A flow control module 410 is provided to control the flow rates of the liquid and the nitrogen gas. In this regard, the flow control module 410 may be adapted to communicate with and control the flow meter 122 and the pump 132 described above and shown in FIG. 1. Similarly, a temperature control module 420 is provided to communicate with and control the thermal regulator 136 for regulating the temperature of the liquid. Finally, an oxygen measurement module 430 may be provided to monitor the operation of the contacting zone 110. In this regard, sensors (not shown) may be provided at the input and output of the contacting zone 110. The sensors may communicate data to the oxygen measurement module 430 to determine the level of deoxygenation being achieved. In some embodiments, the oxygen measurement module 430 may be adapted to transmit a message to an operator indicating a malfunction of the contacting zone 110.

Figure 8:
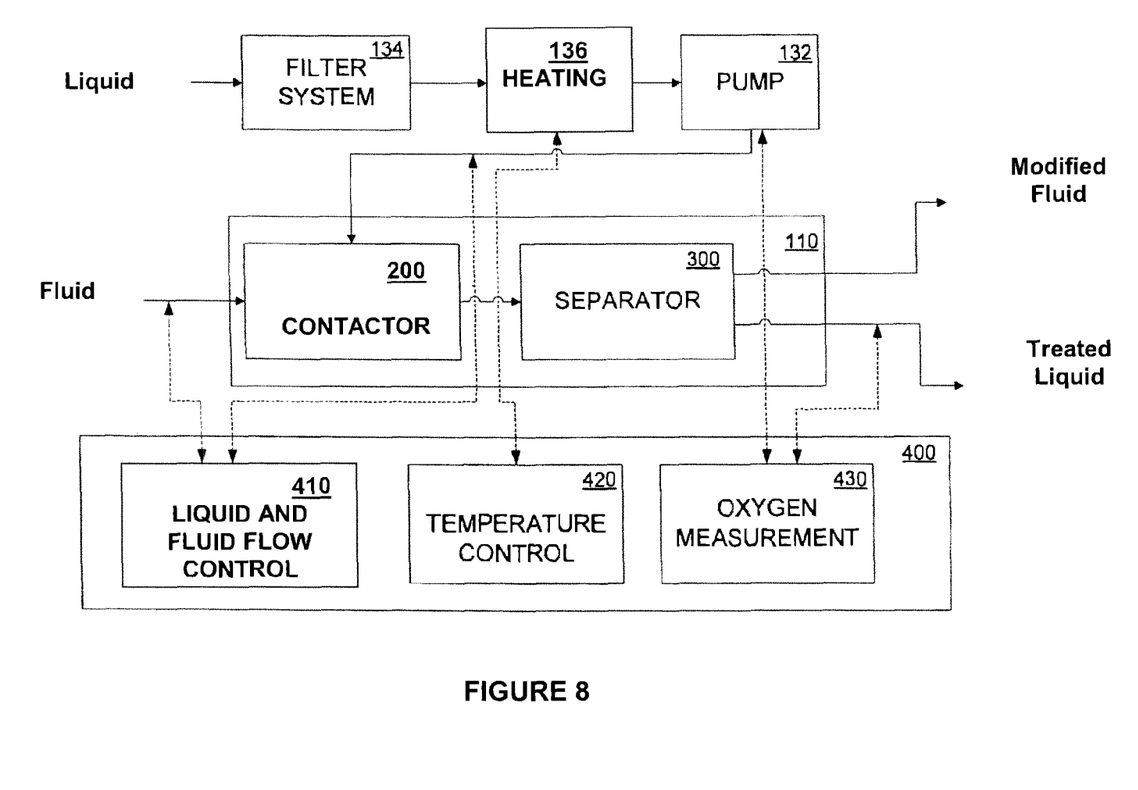
FIG. 8 is another schematic illustration of the contacting system shown in FIG. 1.

As illustrated in FIG. 8, the contacting zone 110 includes a liquid-gas contactor 200 and a gas-liquid separator 300. Each of these components is described below in greater detail.

Figure 9:
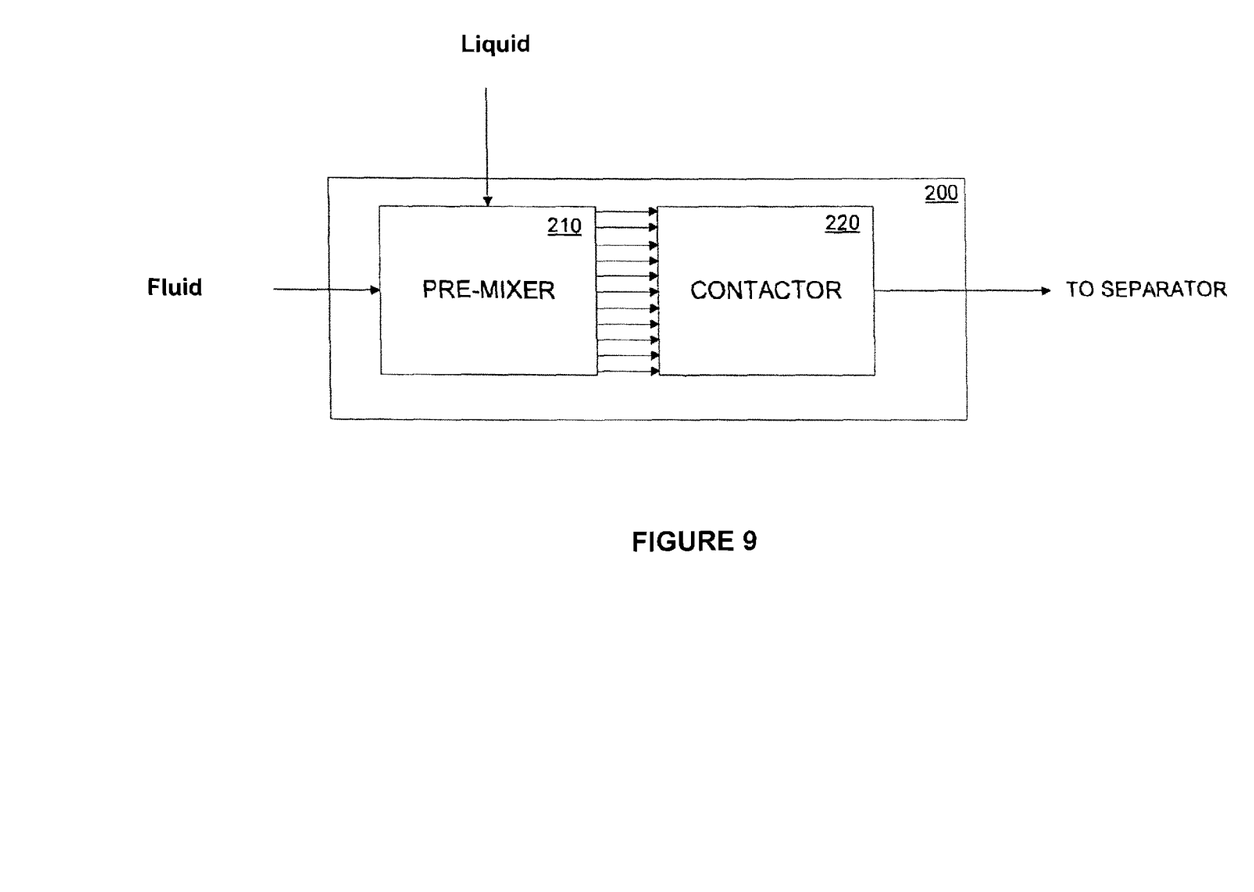
FIG. 9 is a schematic illustration of the contactor module shown in FIG. 2.

FIG. 9 is a schematic illustration of an embodiment of the liquid-gas contactor 200 of the contacting zone 110 shown in FIG. 8. In this embodiment, the liquid-gas contactor 200 includes a pre-mixer 210 for mixing the input streams of liquid and fluid. The pre-mixer 210 facilitates the uniform mixing of the two streams to facilitate deoxygenation of the liquid. An embodiment of the pre-mixer 210 is described in greater detail with reference to FIGS. 4A, 4B and 5 of U.S. Pat. No. 7,459,081, the entire contents of which are hereby incorporated by reference herein. The mixture output by the pre-mixer 210 is directed to a contacting zone 110. The output of the contactor 220 is directed out of the liquid-gas contactor 200 and to the separator 300 (FIG. 2).

The porous body of pre-mixer 210 is preferably made from a porous material with channels for the liquid, as described above. In other embodiments, the pre-mixer can be made from a solid piece or multi piece assembly of solid materials. In this regard, the pre-mixer may include channels for the liquid as well as channels for the fluid. The channels for the fluid may be substantially smaller than the channels for the liquid. However, the cost to manufacture a pre-mixer with solid materials can be substantially higher compared to the cost of using porous materials.

Porosity of the pre-mixer can be chosen with certain basic parameters satisfied. For example, the gas used in the process (e.g., nitrogen gas) should flow through the porous body with minimal flow restriction, such as approximately 1%-6% pressure drop under operating conditions. Further, the liquid being processed (e.g., liquid fuel) may pass through the porous material under pressure closely above operating liquid pressure. The porous material should be chemically compatible or resistant to the fluid and liquid being processed.

The porous body may be designed to accommodate various flow patterns for the liquid. For example, in one embodiment, the flow of the liquid may be substantially axial and linear. In other embodiments, the flow may be non-linear through the porous body. Still in other embodiments, the flow may be substantially radial in certain regions.

A small distance may be provided between the pre-mixer 210 and the contactor 220 to allow the pressure across the contactor to equalize. In one embodiment, this distance is approximately 0.25 to 1.25 mm. In another embodiment, direct mating of the pre-mixer 210a and the contactor 220 may be facilitated by providing a subsectioncd pre-mixer, as illustrated in FIG. 5. In this embodiment, indented regions 299 may be formed on the face of the pre-mixer 210a to sectionalize flow to the contactor 220 in order to reduce the effects of orientation and external forces causing inconsistent process output. In this regard, the face of the contactor facing the pre-mixer 210a may be provided with similar indented regions 299. If sectionalized flow paths are used, axial channels 218a of the pre-mixer 210a should connect to a sectionalized flow compartment of the contactor 220.

It is noted that the fuel-gas contactor 200 may operate without the pre-mixer. The pre-mixer is provided to reduce the effects of orientation and external forces upon the fuel-gas contactor 200

FIG. 10 illustrates an exemplary contacting zone contemplated for use in the practice of the present invention. The internal features of the illustrated embodiment include a plurality of coils and blades which facilitate vigorous and intimate mixing of components being passed therethrough. As readily recognized by those of skill in the art, a variety of shapes that can produce similar levels of vigorous and intimate mixing can also be employed in the practice of the present invention, e.g., flat blades positioned at an angle with respect to the direction of flow, curved blades bearing a variety of shapes (e.g., concave, convex, and the like), saddles, and the like.

While the exemplary embodiments illustrated in the Figures and described above are presently preferred, it should be understood that these embodiments are offered by way of example only. Other embodiments may include, for example, different techniques for performing the same operations. The invention is not limited to a particular embodiment, but extends to various modifications, combinations, and permutations that nevertheless fall within the scope and spirit of the appended claims.

That which is claimed is:

1. A system for removing a reactive component from a liquid and/or a fluid,
   wherein said reactive component is present in at least one of the liquid and the fluid, said system comprising:
   a contacting zone adapted to facilitate contact between said liquid and said fluid, and to cause mixing of said liquid and said fluid, wherein said contacting zone comprises a passageway to transport the mixture of the liquid and the fluid, wherein the passageway is divided into at least two channels that extend in non-linear fashion along the length of the passageway and abruptly change flow directions in periodic fashion, thereby causing continuous mixing and re-distribution between the liquid and the fluid throughout the passageway, thus creating intimate contact between the liquid and the fluid, allowing the efficient transfer of the reactive component therebetween,
   a fluid purification module adapted to remove said reactive component from said fluid when said transfer includes transferring reactive component from said liquid to said fluid, wherein the fluid purification module is adapted to catalytically consume at least a portion of said reactive component in said fluid, and
   a recirculation line adapted to transfer at least a portion of said fluid from said fluid purification module to said contacting zone.

2. The system of claim 1, further comprising a pre-mixer adapted to provide a mixture of the fluid and the liquid to the contacting zone, wherein the pre-mixer includes:
   a plurality of substantially axial channels for passing said liquid therethrough into a path directed toward the contacting zone; and
   a porous body for diffusing said fluid into the path.

3. The system of claim 2, wherein the pre-mixer further comprises an annular passage along a circumferential perimeter of the pre-mixer for receiving the fluid and directing the fluid to the contacting zone.

4. The system of claim 1, further comprising:
   a separator for separating said liquid and said fluid after said mixing.

5. The system of claim 4, wherein the separator includes at least one centrifugal separator.

6. The system of claim 1, further comprising:
a gas scavenger downstream of said fluid purification module.

7. The system of claim 6 wherein said gas scavenger is capable of scavenging $H_2O$, $CO_2$, and/or $O_2$.

8. The system of claim 1, wherein the liquid is a combustible material and the reactive component is a gas.

9. The system of claim 8 wherein said combustible material is a hydrocarbon.

10. The system of claim 9, wherein the hydrocarbon is an oil.

11. The system of claim 9, wherein the hydrocarbon is a fuel.

12. The system of claim 11, wherein the fuel is at least one of diesel, kerosene, and jet fuel.

13. The system of claim 8, wherein the gas is oxygen.

14. The system of claim 1, wherein the reactive component is a gas dissolved in liquid prior to said mixing.

15. The system of claim 1, wherein the fluid is a gas.

16. The system of claim 1 further comprising an independent source of fuel to facilitate deactivation of the reactive component within the fluid purification module.

17. The system of claim 1 further comprising an independent source of makeup air in fluid communication with said fluid purification module.

18. A method of purifying a liquid, said method comprising:
a) passing a liquid and a fluid, said liquid containing a gas therein, through a system comprising:
a contacting zone adapted to facilitate contact between said liquid and said fluid, and to cause mixing of said liquid and said fluid, wherein said contacting zone comprises a passageway to transport the mixture of the liquid and the fluid, wherein the passageway is divided into at least two channels that extend in non-linear fashion along the length of the passageway and abruptly change flow directions in periodic fashion, thereby causing continuous mixing and redistribution between the liquid and the fluid throughout the passageway, thus creating intimate contact between the liquid and the fluid, allowing the efficient transfer of a reactive component therebetween,
a fluid purification module adapted to remove said reactive component from said fluid when said transfer includes transferring reactive component from said liquid to said fluid, wherein the fluid purification module is adapted to catalytically consume at least a portion of said reactive component in said fluid, and
a recirculation line adapted to transfer at least a portion of said fluid from said fluid purification module to said contacting zone, said passing causing mixing of said liquid and said fluid and transfer of at least some of said gas from said liquid to said fluid;
b) separating said liquid and said fluid, said separated fluid including at least some of said gas;
c) removing said gas from said fluid; and
d) recirculating at least a portion of said fluid with gas removed in step c) for use in any continuation of step a) and/or introducing at least a portion of said fluid into a storage vessel from which said liquid is obtained.

19. The method of claim 18, wherein the liquid is a combustible material and the component is a gas.

20. The method of claim 18, wherein the fluid is a gas.

21. A method of purifying a fluid, said method comprising:
a) passing a liquid and a fluid, said fluid containing a gas therein, through a system comprising:
a contacting zone adapted to facilitate contact between said liquid and said fluid, and to cause mixing of said liquid and said fluid, wherein said contacting zone comprises a passageway to transport the mixture of the liquid and the fluid, wherein the passageway is divided into at least two channels that extend in non-linear fashion along the length of the passageway and abruptly change flow directions in periodic fashion, thereby causing continuous mixing and redistribution between the liquid and the fluid throughout the passageway, thus creating intimate contact between the liquid and the fluid, allowing the efficient transfer of the reactive component therebetween,
a fluid purification module adapted to remove said reactive component from said fluid when said transfer includes transferring reactive component from said liquid to said fluid, wherein the fluid purification module is adapted to catalytically consume at least a portion of said reactive component in said fluid, and
a recirculation line adapted to transfer at least a portion of said fluid from said fluid purification module to said contacting zone, said passing causing mixing of said liquid and said fluid and transfer of at least some of said gas from said fluid to said liquid;
b) separating said liquid and said fluid, said separated liquid including at least some of said gas;
c) removing said gas from said liquid; and
d) recirculating at least a portion of said liquid with gas removed in step c) for use in any continuation of step a) and/or introducing at least a portion of said liquid into a storage vessel from which said fluid is obtained.

* * * * *